US011021109B2

(12) United States Patent
H N et al.

(10) Patent No.: US 11,021,109 B2
(45) Date of Patent: Jun. 1, 2021

(54) HIDDEN STORAGE COMPARTMENT HAVING A USER NOTIFICATION SYSTEM AND METHOD OF USING THE SAME

(71) Applicant: GM Global Technology Operations LLC, Detroit, MI (US)

(72) Inventors: Nikhil H N, Bengaluru (IN); Tanmay Balse, Bengaluru (IN); Vinodkumar Ganiger, Dharwad (IN); Rajkiran Kulkarni, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 254 days.

(21) Appl. No.: 16/190,793

(22) Filed: Nov. 14, 2018

(65) Prior Publication Data

US 2020/0148125 A1    May 14, 2020

(51) Int. Cl.
*B60R 7/04*  (2006.01)
*G06F 21/32*  (2013.01)
*B60R 11/00*  (2006.01)

(52) U.S. Cl.
CPC .............. *B60R 7/043* (2013.01); *G06F 21/32* (2013.01); *B60R 2011/0098* (2013.01)

(58) Field of Classification Search
CPC ..... B60R 7/04; B60R 7/06; B60R 2011/0007; B60R 11/00; B60R 11/02; B60R 2011/0094; B60R 2011/0075; B60R 2011/0082; B60R 7/005; G06F 1/1632

USPC ...... 296/37.8, 22.34, 37.12, 75, 64, 63, 214, 296/191; 29/428, 453, 525, 527.1; 49/374, 394, 414, 449, 506
See application file for complete search history.

(56) References Cited

U.S. PATENT DOCUMENTS

| | | | | |
|---|---|---|---|---|
| 5,195,795 A | * | 3/1993 | Cannera | B60N 2/0292 296/65.09 |
| 5,615,922 A | * | 4/1997 | Blanchard | B60R 9/02 224/404 |
| 5,823,598 A | | 10/1998 | Clare et al. | |
| 5,979,962 A | * | 11/1999 | Valentin | B60R 13/01 296/37.1 |
| 6,102,463 A | | 8/2000 | Swanson et al. | |
| 6,237,211 B1 | | 5/2001 | Clare et al. | |
| 7,686,365 B2 | * | 3/2010 | Thelen | B60R 9/00 296/37.6 |

(Continued)

*Primary Examiner* — D Glenn Dayoan
*Assistant Examiner* — Sunsurraye Westbrook
(74) *Attorney, Agent, or Firm* — Vivacqua Crane

(57) ABSTRACT

A vehicle having a hidden storage compartment with a user notification system and method of using the same is provided. The vehicle includes a storage container securely fixed onto an interior surface of a vehicle floor panel in the footwell area. A floor covering is disposed over the footwell area covering the storage container and includes a flap having a living hinge configured to selectively cover and uncover the lid of the storage container. The storage container includes a biometric scanner, a mass sensor, and a lid sensor in communication with a notification controller. The notification controller analyzes the information received from the biometric scanner, lid sensor, and mass sensor, and determines the state of the storage container based on a logic table. The notification controller then selectively transmit a predetermined message to the user based on the state of the storage container.

17 Claims, 3 Drawing Sheets

(56) References Cited

U.S. PATENT DOCUMENTS

| | | | | |
|---|---|---|---|---|
| 7,914,074 | B2* | 3/2011 | Lindsay | B60R 7/043 |
| | | | | 297/188.13 |
| 9,409,525 | B2* | 8/2016 | Gillam | B62D 33/023 |
| 9,493,113 | B2* | 11/2016 | Salter | B60Q 3/68 |
| 9,539,957 | B2* | 1/2017 | Engerman | B25H 3/02 |
| 2002/0053810 | A1* | 5/2002 | Kaluszka | B62D 43/10 |
| | | | | 296/37.3 |
| 2013/0200997 | A1* | 8/2013 | Miller | H04W 12/0605 |
| | | | | 340/5.52 |
| 2016/0090046 | A1* | 3/2016 | Engerman | B60R 11/06 |
| | | | | 296/37.2 |
| 2018/0196428 | A1* | 7/2018 | Pilutti | B60K 35/00 |

* cited by examiner

HIDDEN STORAGE COMPARTMENT HAVING A USER NOTIFICATION SYSTEM AND METHOD OF USING THE SAME

INTRODUCTION

The present disclosure relates to storage compartments in a vehicle, more particularly to a hidden storage compartment having a user notification system.

It is common for modern vehicles to have interior storage compartments provided in the passenger cabin for the convenience of the occupants of the vehicle to store personal items or objects such as documents, sun glasses, wallets, etc. The storage compartments are provided in various different locations within the passenger cabin that are immediately accessible to the user. Examples of such locations include a glove box in the instrument panel area of the vehicle, side pockets of the doors, overhead consoles, and floor consoles located between the driver and passenger seats.

While storage compartments are desirable, it also takes up valuable passenger compartment space including headroom, floor space, seat space, and leg space. These storage compartments are also visible to any passersby viewing into the passenger cabin, thus suggesting there might be something of value contained within the storage compartments and possibly inviting theft. It is not uncommon to provide a locking mechanism to selected compartments to safeguard the interior contents, such as a key lock on the glove box. However, key locks might be easily compromised and the contents removed without the awareness of the user.

Thus, while interior storage compartments in the passenger cabin of vehicles achieve their intended purpose, there is a need for a storage compartment that does not significantly intrude into the occupant space and not immediately visible to passersby. There is also a further need for a storage compartment that is accessible to only the intended user and notifies the user of any unauthorized access.

SUMMARY

According to several aspects, a vehicle having a hidden storage container is disclosed. The vehicle includes a floor panel having an interior surface defining a footwell area, a storage container securely fixed onto the interior surface of the floor panel in the footwell area, and a floor covering disposed over the footwell area covering the storage container. The storage container includes an interior surface defining a storage compartment and a lid configured to selectively cover and uncover the storage compartment. The floor covering includes a flap configured to selectively cover and uncover the lid of the storage container.

In an additional aspect of the present disclosure, the interior surface of the storage container includes a foam coating configured to reduce the noise, vibration, and harshness of an object shifting in the storage container during a normal operation of the vehicle.

In another aspect of the present disclosure, the vehicle further includes an insulating layer between the floor panel and floor covering. The insulating layer defines a space in which the storage container is disposed in.

In another aspect of the present disclosure, the storage container further includes a biometric lock having a biometric scanner configured to recognize one or more of a unique predetermined characteristics of a user.

In another aspect of the present disclosure, the storage container further includes a mass sensor configured to detect a change in mass within the storage compartment to determine if an object has been added or removed.

In another aspect of the present disclosure, the storage container further includes a lid sensor configured to detect if the lid is in an open or closed position.

In another aspect of the present disclosure, the vehicle further includes a vehicle transmitter and a notification controller in electronic communications with the biometric scanner, lid sensor, mass sensor, and vehicle transmitter. Each of the electronic mass sensor, lid sensor, and biometric scanner is configured to collect and send information to the notification controller. The notification controller is configured to analyze the information received from the biometric scanner, lid sensor, and mass sensor, and selectively transmit, using the vehicle transmitter, a predetermined message to the user.

In another aspect of the present disclosure, the vehicle further includes an engine control module (ECM) in electronic communication with the notification controller.

In another aspect of the present disclosure, in which the remote receiver is a personal communication device.

In another aspect of the present disclosure, in which the floor covering is a carpeting layer and includes a living hinge connecting the flap.

According to several aspects, a storage container notification system for a vehicle is disclosed. The system includes a storage container having an interior surface defining a storage compartment; a lid configured to selectively open and close the storage compartment; a lid sensor configured to detect whether the lid is in an open position or in a closed position; a biometric scanner configured to authenticate a predetermined user; a vehicle transmitter; and a notification controller in communication with the lid sensor, biometric scanner, and transmitter. The notification controller is configured to transmit a predetermined message, using the vehicle transmitter, if the lid sensor detects the lid in an open position and the biometric scanner fails to authenticate the predetermined user.

In an additional aspect of the present disclosure, the system further includes an electronic mass sensor configured to detect whether the storage compartment is in an occupied state or empty state.

In another aspect of the present disclosure, the system further includes a remote receiver, wherein the notification controller is configured to transmit a predetermined message to the remote receiver.

In another aspect of the present disclosure, the remote receiver is one of a personal communication device and a service provider that relays the predetermined message to the user.

In another aspect of the present disclosure, the system further includes an electronic key pad activated by authentication of the use by the biometric scanner.

According to several aspects, a method of using a vehicle storage container notification system is disclosed. The method includes determining, using a lid sensor, whether a lid of a storage container is in one of an open and closed position; scanning at least one unique characteristics of a predetermined user, using a biometric scanner, to authenticate the predetermined user; and sending a message to a remote receiver if the lid is in an open position and the predetermined user was not authenticated.

In an additional aspect of the present disclosure, the method further includes determining, using a mass sensor, whether an object is present in the storage container; assigning one of a first status to the mass sensor if an object is present in the storage container and a second status if an object is not present in the storage container; assigning one of a first status to the biometric scanner if the user was authenticated by the biometric scanner and a second status if the user was not authenticated by the biometric scanner; assigning one of a first status to the lid sensor if the lid is in an open position and a second status if the lid is in a closed position; and processing the combinations of first and second statuses assigned to the biometric scanner, mass sensor, and lid sensor to make an interpretation as to an overall state of the storage container and identify an action item output.

In another aspect of the present disclosure, the action item output includes transmitting a predetermined message including notification user of object placement, unauthorized entry, reminder about leftover belonging, notification of object retrieval, and notification of theft.

In another aspect of the present disclosure, the method further includes selecting the predetermined message, using a logic table, based on a combination of first and second statuses assigned to the mass sensor, biometric scanner, and lid sensor.

In another aspect of the present disclosure, the method further includes sending the predetermined message to a remote device including at least one of a personal communication device and message relay service provider.

The vehicle storage compartment having a user notification system as disclosed summarized herein provides the advantage of a storage compartment that does not significantly intrude into the occupant space. It also provides the further advantage of a storage compartment that is readily accessible by the vehicle occupant/user. It further provides the advantage of a storage compartment that is not immediately visible to passersby and is accessible to only the intended user thereby reducing the risk of theft. It still further provides the advantage a user notification system that notifies the user of any unauthorized access to the storage compartment.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
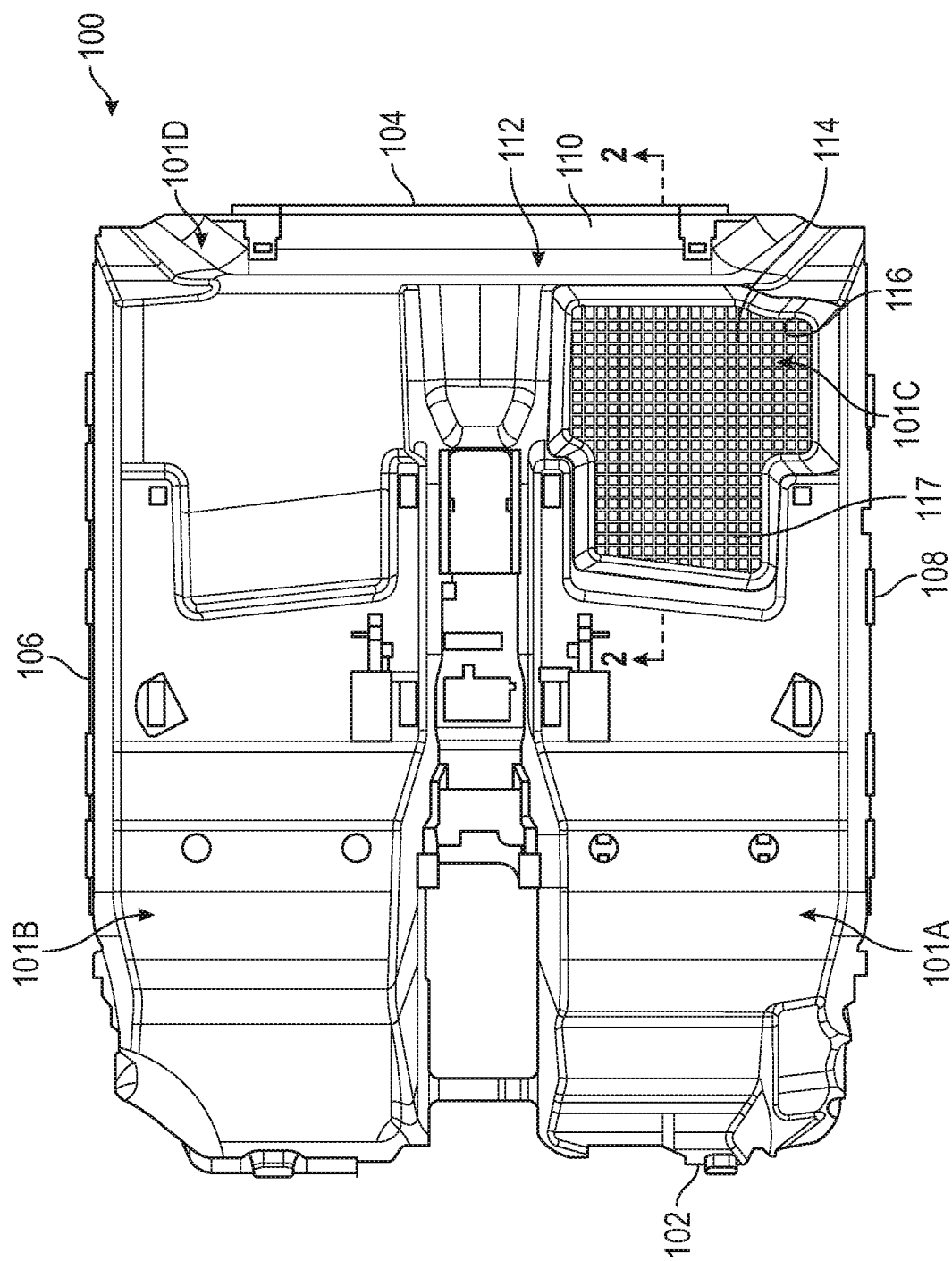
FIG. 1 is a schematic top view of a portion of a passenger cabin of a vehicle.

FIG. 1 is a top view of a portion of an interior passenger cabin, generally indicated by reference numeral 100, of an exemplary land-based vehicle, such as a passenger car. It should be appreciated that the interior passenger cabin 100 may also be that of a water-based or air-based vehicle without departing from the scope of the present disclosure. The portion of the interior passenger cabin 100 illustrated includes a front end 102, an opposing rear end 104, a right side 106 generally extending between the front end 102 and rear end 104, and an opposing 108 left side. The passenger cabin 100 contains multiple occupant seating areas including an operator seating area 101A, front passenger seating area 101B, a left rear passenger seating area 101C, and right rear passenger seating area 101D. For clarity of illustration and description, the portion of the interior passenger cabin 100 is illustrated without the seating assemblies, center console, and instrument panel.

At least one of the seating areas 101A, 101B, 101C, 101D includes a hidden storage container 120 having a user notification system 200. The left rear passenger seating area 101C will be referenced as an exemplary seating area having the hidden storage container 120. The seating area 101C includes a seating assembly (not shown) mounted on a raised platform area 110 and a recessed footwell area 112 immediately adjacent the platform area 110. The footwell area 112 is configured to receive the extension of the occupant's legs and placement of the occupant's foot. The footwell area 112 includes a footwell floor 114 having a floor covering 116 such as carpeting or vinyl layer and may include a floor mat 117 over a portion of the floor covering 116.

Figure 2:
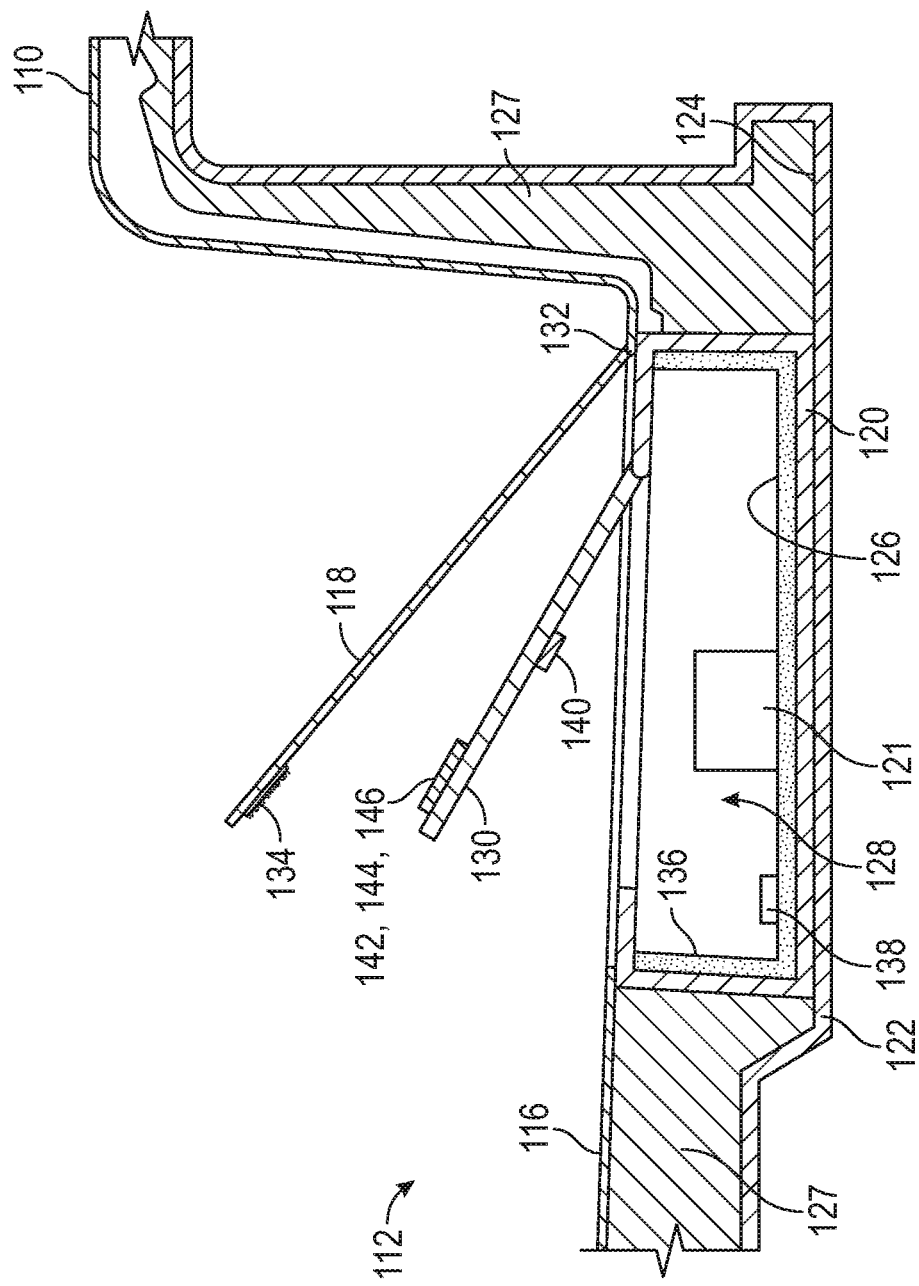
FIG. 2 is a schematic partial cross-section of the passenger cabin of a FIG. 1 across line 2-2 showing a hidden storage compartment.

FIG. 2 is a schematic cross-section of the vehicle along line 2-2 of the left passenger area 101C shown in FIG. 1. The floor covering 116 includes a flap 118 that may be selectively folded back, lifted, or removed to provide access to a hidden storage container 120 disposed in the footwell area 112 beneath the floor covering 116. It is preferable that the hidden storage container 120 is disposed at a sufficient distant from the raised platform area 110 such that the occupant positioned in the seating assembly on the platform area 110 only needs to bend forward at the waist to access the hidden storage container 120 while the passenger is in a seated position.

The vehicle includes a floor panel 122 that is formed by stamping a sheet of metallic material, such as steel, or molded from a composite material. The floor panel 122 includes an interior surface 124 facing the interior passenger cabin 100 of the vehicle, a thermal insulator layer 127 disposed onto the interior surface 124, and the floor covering 116 disposed onto the insulator layer 127. The storage container 120 is disposed between the floor panel 122 and the floor covering 116 in a space defined by an absence of the insulator layer 127. The storage container 120 includes an interior container surface 126 defining a storage compartment 128 and a lid 130 configured to selectively cover and uncover the storage compartment 128. The flap 118 of the floor covering 116 (shown in an open uncovered position) is placed over the storage container 120 and is configured to selectively allow access to the lid 130 of the storage container 120. The flap 118 may include a living hinge 132 for the ease of bending the flap 118 between an uncovered position and covered position. The living hinge 132 connects the flap 118 with the main floor covering 116. The living hinge 132 is a thin flexible hinge made from the same material as the flap 118 and the main floor covering 116 in order to visually conceal the folding edge of the flap 118. Hook and loop fasteners 134 may be used to securely fasten the flap 118 in the covered position to visually obscure the storage container 120.

The storage container 120 is securely fixed onto the floor panel 122 to prevent removal of the storage container 120 from the vehicle. The storage container 120 may be formed of a metallic material welded to or securely bolted to the metallic floor panel 122 or may be formed of a composite material epoxied to the floor panel 122. The interior surface 126 of the storage container 120 includes a foam coating 136 configured to damping noise, vibration, and harshness generated by an object 121 shifting or vibrating within the storage container 120 caused by the normal operation of the vehicle. The storage container 120 further includes an electronic mass sensor 138 to detect the change in mass of the content of the storage container 120 to determine if an article has been added or removed from the storage container 120, an electronic lid sensor 140 to detect if the storage container 120 is in an open or closed position, and an electronic lock 142 configured to selectively lock the lid 130 in the closed position.

The electronic lock 142 may include an electronic key pad 144 for a user of the storage container 120 to enter a predetermine authentication code or password in order to unlock the lid 130. The electronic lock 142 may also be that of a biometric lock having a biometric scanner 146 that recognizes one or more user unique characteristics of the user, such as the face, voice, fingerprint, and/or retina in order to unlock the lid 130. The electronic lock 142 may also be that of a combination biometric and key pad 144 lock were the biometric scanner 146 authenticate the user by recognizing one or more user unique characteristics, and then allows the user to enter the predetermined authentication code to unlock the lid 130.

Figure 3:
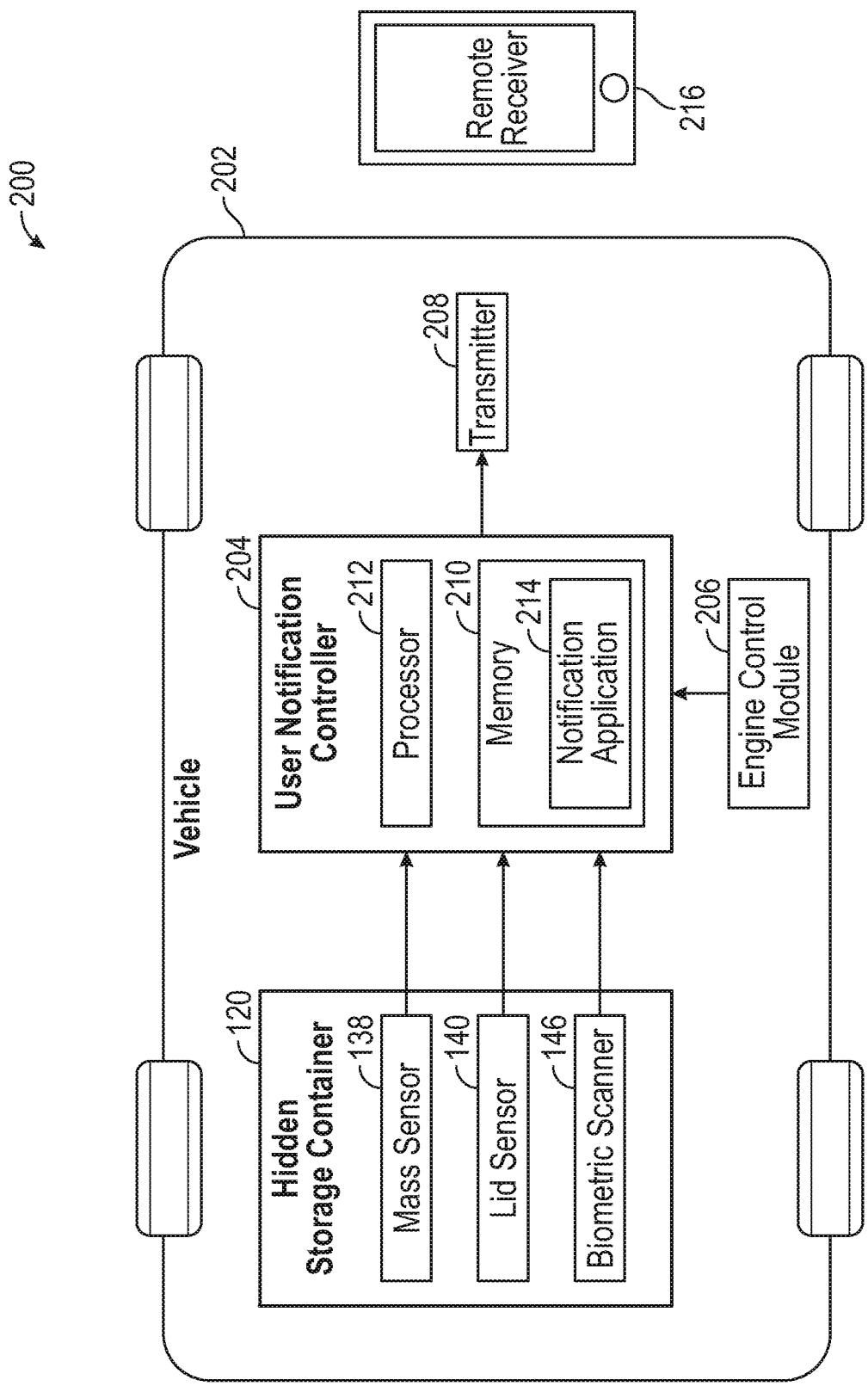
FIG. 3 is a schematic functional diagram of a user notification system for the hidden storage compartment of FIG. 2.

Referring to FIG. 3 is functional diagram of the hidden storage compartment 128 having a notification system 200 in a vehicle 202. The notification system 200 includes a notification controller 204 in electronic communication with the mass sensor 138, lid sensor 140, and biometric scanner 146 of the storage container 120. The electronic mass sensor 138 is configured to send a message to the notification controller 204 indicating whether the container 120 contains an object 121 or does not contain an object 121. The lid sensor 140 is configured to send a message to the notification controller 204 indicating whether the lid 130 is in an open position or closed position. The biometric scanner 146 is configured to send a message to the notification controller 204 indicating whether the biometric scanner 146 was activated by the user or not activated by the user. The notification controller 204 may also be in electronic communication with an engine control module (ECM) 206 of the vehicle 202, where the ECM 206 communicates to the notification controller 204 on whether the vehicle ignition is in an on position or an off position. The notification controller 204 is also in communication with a vehicle transmitter 208.

The information collected by the mass sensor 138, biometric scanner 146, and lid sensor 140 may be processed by the notification controller 204, a separate processor (not shown), and/or an application-specific integrated circuit (ASIC) designed for the specific types of lid sensor 140, mass sensor 138, and/or biometric scanner 146 used in the user notification system 200. It should be appreciated that the ASIC processor may be built into the circuitry of the each of the lid sensor 140, mass sensor 138, and/or biometric scanner 146. The notification controller 204 may be that of one or more micro-processors; one or more control modules having a memory 210 or non-transitory computer readable medium used to store notification applications 214, and a processor 212 used to process to execute the stored applications 214; and/or that of the vehicle ECM 206 itself.

Based on the information received from the biometric scanner 146, mass sensor 138, and lid sensor 140, the notification controller 204 assigns a first status (such as a YES or a 1) or a second status (such as a NO or a 2) to each of the biometric scanner 146, mass sensor 138, and lid sensor 140. Referring to Table 1 below:

TABLE 1

|  | YES | NO |
| --- | --- | --- |
| Biometric Scanner | Scanner used by owner | Scanner not used by owner |
| Mass Sensor | Object present inside container | Container is empty |
| Lid sensor | Lid open | Lid not open |

The user notification controller 204 assigns a YES status to the biometric scanner 146 to indicate that the owner/user was authenticated by biometric scanner 146 or a NO status to indicate the owner/user was not authenticated by the biometric scanner 146. The user notification controller 204 assigns a YES status to the mass sensor 138 to indicate that an object 121 is present in the storage container 120 or a NO status to indicate that an object 121 is not present in the storage container 120. The user notification controller 204 assigns a YES status to the lid sensor 140 to indicate that the lid 130 is in an open position or a NO status to indicate that the lid 130 is in a closed position.

The notification controller 204 processes the various combinations of statuses of the biometric scanner 146, mass sensor 138, and lid sensor 140 to make an interpretation as to the overall state of the contents of the storage container 120 and identifies an action item output from the user notification system 200 based on a logic table. The action items include, but are not limited to, transmitting a predetermined message to a remote receiver 216 notifying the user of: object placement, unauthorized entry, reminder about leftover belonging, object retrieval, and/or potential theft. In all cases the biometric scanner 146 will auto-lock the system after 10-15 seconds of inactivity of the lid sensor 140.

Table 2 below is an exemplary logic table that the notification system 200 may utilize to make an interpretation as to the state of the content (STATE) in the storage container 120 and to make a determination as to the associated action output, such as transmitting a predetermined message to the remote receiver 216. The remote receiver 216 may be that of a personal communication device including, but not limited to, a smart phone, a pager, a tablet, a computer, and/or a key fob. The remote receiver may also be that of a service provider that relays the predetermined message to the user.

TABLE 2

| Sensor type | STATE 1 | STATE 2 | STATE 3 | STATE 4 |
|---|---|---|---|---|
| Biometric Scanner | Yes | No | No | Yes |
| Mass Sensor | Yes | Yes | Yes | Yes |
| Lid Sensor | Yes | Yes | No | No |
| Notification Controller Interpretation | Inserts an object into the container/ inspects an object | Forced opening | Forgotten belonging input + ignition off | Door not yet open |
| Action from System | Notification of object placement | Notification of unauthorized entry | Notification reminder about leftover belonging | No action required |

| Sensor type | STATE 5 | STATE 6 | STATE 7 | STATE 8 |
|---|---|---|---|---|
| Biometric Scanner | Yes | No | Yes | No |
| Mass Sensor | No | No | No | No |
| Lid Sensor | Yes | Yes | No | No |
| Notification Controller Interpretation | Normal retrieval | Forced retrieval | Empty container | Invalid |
| Action from System | Notification of object retrieval | Notification of theft | No action required | No action required |

In a first example, referring to Table 2, STATE 1, a first status (YES) is assigned to the biometric scanner 146 to indicate that a predetermined user was authenticated by the biometric scanner 146, a first status (YES) is assigned to the mass sensor 138 to indicate an object is present in the storage container, and a first status (YES) is assigned to the lid sensor 140 to indicate the lid is in an open position. Based on a first status (YES) assigned to the biometric scanner 146, mass sensor 138, and lid sensor 140, the notification controller 204 interprets the state of the content to be "insertion of an object into the container or the user inspects an object already in the container". The notification controller 204 will then transmit a predetermined message of "Notification of object placement" to the remote receiver 216.

In a second example, referring to Table 2, STATE 6, a second status (NO) is assigned to the biometric scanner 146 to indicate that a predetermined user was not authenticated by the biometric scanner 146, a second status (NO) is assigned to the mass sensor 138 to indicate an object is not present in the storage container, and a first status (YES) is assigned to the lid sensor 140 to indicate the lid is in an open position. Based on a first status (YES) assigned to the lid sensor 140, and a second status (NO) assigned to both the biometric scanner 146 and mass sensor 138, the notification controller 204 interprets the state of the content to be "forced retrieval". The notification controller 204 will then transmit a predetermined message of "Notification of theft" to the remote receiver 216.

The vehicle storage compartment 128 having a user notification system 200 as disclosed herein provides at least the advantages of a storage compartment 128 that does not significantly intrude into the occupant space, a storage compartment 128 that is readily accessible by the vehicle occupant/user, a storage compartment 128 that is not immediately visible to passersby, a storage compartment 128 that is accessible to only the intended user, and a user notification system 200 that notifies the user of any unauthorized access to the storage compartment 128.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle having a hidden storage container, comprising:
   a floor panel having an interior surface defining a footwell area;
   a storage container securely fixed onto the interior surface of the floor panel in the footwell area, wherein the storage container includes an interior surface defining a storage compartment and a lid configured to selectively cover and uncover the storage compartment; and
   a floor covering disposed over the footwell area covering the storage container, wherein the floor covering includes a flap configured to selectively cover and uncover the lid of the storage container;
   wherein the storage container further comprises a lock having a biometric scanner configured to recognize one or more of a predetermined characteristic of a user, and
   wherein the storage container further comprises a mass sensor configured to detect a change in mass within the storage compartment to determine if an object is present or not present in the storage compartment.

2. The vehicle of claim 1, wherein the interior surface of the storage container includes a foam coating configured to reduce a noise, vibration, and harshness of an object shifting in the storage container during a normal operation of the vehicle.

3. The vehicle of claim 2, further comprising an insulating layer between the floor panel and floor covering, wherein the insulating layer defines a space in which the storage container is disposed in.

4. The vehicle of claim 1, wherein the storage container further comprises a lid sensor configured to detect if the lid is in an open or a closed position.

5. The vehicle of claim 4, further comprising:
a vehicle transmitter; and
a notification controller in electronic communications with the biometric sensor, the lid sensor, the mass sensor, and the vehicle transmitter;
wherein each of the mass sensor, the lid sensor, and the biometric scanner is configured to collect and send information to the notification controller; and
wherein the notification controller is configured to analyze the information received from the biometric sensor, lid sensor, and mass sensor, and selectively transmit, using the vehicle transmitter, a predetermined message to a remote receiver based on the analysis of the information.

6. The vehicle of claim 5, further comprising an engine control module (ECM) in electronic communication with the notification controller.

7. The vehicle of claim 5, wherein the remote receiver is one of a personal communication device and a service provider that relays the predetermined message to the user.

8. The vehicle of claim 1, wherein the floor covering includes a carpeting layer having a flap with a living hinge.

9. A storage container notification system for a vehicle comprising:
a storage container having an interior surface defining a storage compartment;
a lid configured to selectively open and close the storage compartment;
a lid sensor configured to detect whether the lid is in an open position or in a closed position;
a biometric scanner configured to authenticate a predetermined user;
a vehicle transmitter;
a notification controller in communication with the lid sensor, the biometric scanner, and the vehicle transmitter, wherein the notification controller is configured to transmit a predetermined message, using the vehicle transmitter, if the lid sensor detects the lid in an open position and the biometric scanner fails to authenticate the predetermined user; and
an electronic mass sensor configured to detect a change in mass within the storage compartment to determine if an object is present or not present in the storage compartment.

10. The storage container notification system of claim 9, further comprising a remote receiver, wherein the notification controller is configured to transmit a predetermined message to the remote receiver.

11. The storage container notification system of claim 10, wherein the remote receiver is one of a personal communication device and a service provider that relays the predetermined message to the user.

12. The storage container notification system of claim 9, further comprising an electronic key pad activated by authentication of the use of the biometric scanner.

13. A method of using a vehicle storage container notification system, comprising:
determining, using a lid sensor, whether a lid of a storage container is in one of an open position and closed position;
scanning at least one characteristics of a predetermined user, using a biometric scanner, to authenticate the predetermined user; and
sending a predetermined message to a remote receiver if the lid is in an open position and the predetermined user was not authenticated.

14. The method of claim 13, further comprising:
determining, using a mass sensor, whether an object is present in the storage container;
assigning one of a first status to the mass sensor if an object is present in the storage container and a second status if an object is not present in the storage container;
assigning one of a first status to the biometric scanner if the predetermined user was authenticated by the biometric scanner and a second status if an authentication was not successful;
assigning one of a first status to the lid sensor if the lid is in an open position and a second status if the lid is in a closed position; and
processing the combinations of first and second statuses assigned to the biometric scanner, the mass sensor, and the lid sensor to make an interpretation as to an overall state of the storage container and identify an action item output.

15. The method of claim 14, wherein the action item output includes transmitting a predetermined message notifying the predetermined user of at least one of: object placement, unauthorized entry, reminder about leftover belonging, object retrieval, and possible theft of object.

16. The method of claim 15, further comprising selecting the predetermined message, using a logic table, based on a combination of first and second statuses assigned to the mass sensor, the biometric scanner, and the lid sensor.

17. The method of claim 16, further comprising sending the predetermined message to a remote device including at least one of a personal communication device and a message relay service provider.

* * * * *